(12) United States Patent
Dai et al.

(10) Patent No.: US 8,490,192 B2
(45) Date of Patent: Jul. 16, 2013

(54) METHOD AND SYSTEM FOR CLEANING MALICIOUS SOFTWARE AND COMPUTER PROGRAM PRODUCT AND STORAGE MEDIUM

(75) Inventors: Shih-Yao Dai, Taipei (TW); Yu-Chen Chang, Taipei (TW); Jain-Shing Wu, Taipei (TW); Chih-Hung Lin, Taipei County (TW); Yen-Nun Huang, Taipei (TW); Sy-Yen Kuo, Taipei (TW)

(73) Assignee: Institute for Information Industry, Taipei (TW)

( * ) Notice: Subject to any disclaimer, the term of this patent is extended or adjusted under 35 U.S.C. 154(b) by 931 days.

(21) Appl. No.: 12/571,447

(22) Filed: Oct. 1, 2009

(65) Prior Publication Data

US 2011/0023120 A1    Jan. 27, 2011

(30) Foreign Application Priority Data

Jul. 23, 2009 (TW) .............................. 98124903 A (51) Int. Cl.
*G06F 12/14* (2006.01)

(52) U.S. Cl.
USPC .......................................................... 726/23

(58) Field of Classification Search
USPC .......................................................... 726/23
See application file for complete search history.

(56) References Cited

U.S. PATENT DOCUMENTS

2009/0049552 A1* 2/2009 Williamson et al. ............ 726/24

* cited by examiner

*Primary Examiner* — Kambiz Zand
*Assistant Examiner* — Aubrey Wyszynski
(74) *Attorney, Agent, or Firm* — Jianq Chyun IP Office (57) ABSTRACT

A method and a system for cleaning malicious software (malware), a computer program product, and a storage medium are provided. A relation graph is established to associate processes in an operating system and related elements. A node marking action is performed on the relation graph when a predetermined condition is satisfied. The node corresponding to a malicious process and its related nodes are marked with a first label. The nodes of other normal processes and their related nodes are marked with a second label. Then, those nodes marked with both the first label and the second label are screened, so that each of the nodes is marked with only the first label or the second label. Finally, the processes and elements corresponding to the nodes marked with the first label are removed.

17 Claims, 5 Drawing Sheets

METHOD AND SYSTEM FOR CLEANING MALICIOUS SOFTWARE AND COMPUTER PROGRAM PRODUCT AND STORAGE MEDIUM

CROSS-REFERENCE TO RELATED APPLICATION

This application claims the priority benefit of Taiwan application serial no. 98124903, filed on Jul. 23, 2009. The entirety of the above-mentioned patent application is hereby incorporated by reference herein and made a part of specification.

BACKGROUND OF THE INVENTION

1. Field of the Invention

The present invention generally relates to a mechanism for cleaning malicious software (malware), and more particularly, to a method and a system for cleaning malware by detecting all processes and elements related to a malicious process according to a relation graph, and a computer program product and a storage medium thereof.

2. Description of Related Art

The development of computer information technology brings great impact upon our society and daily life. People rely more and more on computer systems to carry out various operations. In particular, many of these operations, such as web browsing, email sending/receiving, and online shopping, are carried out through the Internet. Accordingly, malicious software (malware) is created by some people for attacking computer systems. A computer system will be attacked by a malware if the computer system is connected to a malicious website.

Malwares may threaten the security of confidential information stored in computer systems or damage these computer systems. Thus, users of the computer systems or the Internet have to spend a lot of time and money for preventing the attack of such malwares, mostly by using antivirus software. Generally speaking, an antivirus software company captures these malwares and analyzes the feature codes thereof, such that when any malware is detected, the antivirus software can remove the malware according to its feature code.

However, a malware has two major elements, one is an attacker for attacking a computer system, and the other is an instigator for controlling and maintaining the malicious processes. Because the instigator only performs maintenance works in the attacked computer system but does not directly attack the computer system, it is difficult to be found by an antivirus software company, and accordingly the feature code thereof cannot be summarized. Thus, it is difficult to completely remove the instigator. After the attacker is detected and deleted by an antivirus software, the instigator is still able to copy or download new attackers and continue to steal confidential information from the attacked computer system. As a result, a user may lose his valuable data unconsciously or a computer system may be constantly jeopardized, and property or reputation loss may be further caused.

SUMMARY OF THE INVENTION

Accordingly, the present invention is directed to a method for cleaning malicious software (malware), wherein elements related to the malware can be detected and removed regardless of whether a computer system is already attacked by the malware or not.

The present invention is directed to a system for cleaning malware, wherein an instigator is detected according to a relation graph, so that the malware can be completely removed.

The present invention provides a malware cleaning method. First, a relation graph is established, wherein the relation graph includes a plurality of nodes, the nodes are respectively corresponding to a plurality of processes in an operating system (OS) and elements related to these processes, and the relations between the nodes are established according to the relations among the processes and the elements. Then, a node marking action is performed on the relation graph when a predetermined condition is satisfied. The node marking action includes marking each node along both or one of an outgoing relation and an incoming relation of the node. Besides, the node marking action further includes marking the node of a malicious process and related nodes with a first label, then marking the nodes without the first label and corresponding to other normal processes and related nodes with a second label, and screening those nodes marked with both the first label and the second label so that each of the nodes is marked with only one of the first label and the second label. Finally, the processes and elements corresponding to the nodes marked with the first label are removed.

The present invention further provides a malware cleaning system including a relation graph establishing module, a malware detection module, and a dubious object inspection module. The relation graph establishing module establishes a relation graph, wherein the relation graph includes a plurality of nodes, these nodes are respectively corresponding to a plurality of processes in an OS and elements related to these processes, and the relations between the nodes are established according to the relations among the processes and the elements. The malware detection module detects a malicious process in the OS. The dubious object inspection module performs a node marking action on the relation graph when a predetermined condition is satisfied, wherein the node marking action includes marking each node along both or one of an outgoing relation and an incoming relation of the node. To be specific, the node marking action includes marking the node of the malicious process and related nodes with a first label, then marking the nodes without the first label and corresponding to other normal processes and related nodes with a second label, and screening the nodes marked with both the first label and the second label so that each of the nodes is marked with only one of the first label and the second label. After performing the node marking action, the dubious object inspection module removes those processes and elements corresponding to the nodes marked with the first label.

According to an embodiment of the present invention, the node marking action is to determine whether the label of each of the nodes can spread along both or one of the outgoing relation and the incoming relation of the node according to a node marking rule, so as to determine whether the nodes related to the node should be marked with the label of the node.

According to an embodiment of the present invention, the step of screening the nodes marked with both the first label and the second label includes following steps. When one of the nodes is marked with both the first label and the second label, whether the node is in a white list is determined so as to re-mark the node with the first label or the second label. To be specific, if the node is not in the white list, the node is re-marked with the first label, and the nodes related to the current node are also marked with the first label. Contrarily, if the node is in the white list, an inspection action is performed on the node to determine whether the node is infected by the malicious process. The inspection action is to inspect whether the process or element corresponding to the node is infected by the malicious process through a hash algorithm. If the process or element corresponding to the node is not infected by the malicious process, the node is re-marked with the second label. If the process or element corresponding to the node is infected by the malicious process, the process or element corresponding to the node is restored through a restoration mechanism. After the process or element corresponding to the node is restored through the restoration mechanism, the node is re-marked with the second label.

According to an embodiment of the present invention, the predetermined condition is that the malicious process is detected among the processes and is about to jeopardize the OS. Or, the predetermined condition is that the malicious process is detected among the processes and the incoming relation is produced on the node corresponding to the malicious process.

The present invention also provides a non-transitory computer program product including a plurality of program instructions, wherein the program instructions are suitable for being loaded into a computer system and executed by the same to accomplish the malware cleaning method described above.

The present invention further provides a non-transitory computer-readable storage medium for storing a computer program, wherein the computer program is suitable for being loaded into a computer system and executed by the same to accomplish the malware cleaning method described above.

As described above, in the present invention, a relation graph between all the processes in an OS and related elements is established according to the behaviours of the processes, and elements infected by a malicious process are detected according to the relation graph. In addition, a node marking action is performed on the relation graph so that not only those elements related to the malicious process can be found, but the instigator of a malware can be detected. Thereby, the malware can be completely removed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
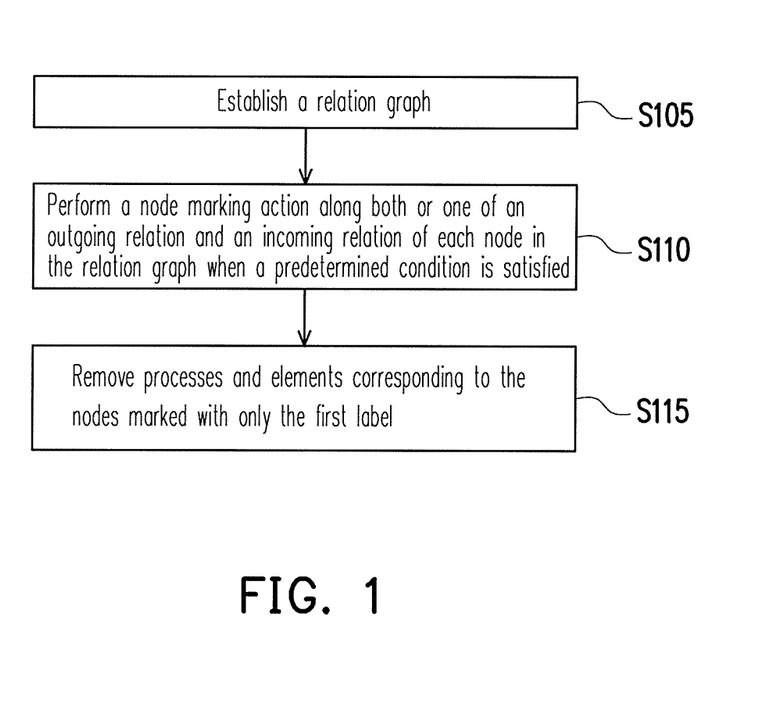
FIG. 1 is a flowchart of a malicious software (malware) cleaning method according to an embodiment of the present invention.

FIG. 1 is a flowchart of a malicious software (malware) cleaning method according to an embodiment of the present invention. Referring to FIG. 1, first, a relation graph is established in step S105, wherein the relation graph records the relations between the processes executed by an operating system (OS) and elements related to these processes such that all the elements related to each process can be obtained according to the relation graph. The elements related to each process may be executable files, dynamic link libraries (DLL), sub processes, network connections, and OS settings, etc. The OS is executed by a computer system, and the elements related to each process are stored in a storage device, such as a memory or a hard disk, of the computer system.

Generally speaking, the processes communicate with the OS through system calls, so as to use resources provided by the OS. For example, a file has to be opened through a corresponding system call. Similarly, a malicious process can only jeopardize the computer system through system calls. System calls act as an interface between the processes and the OS, and which can be categorized into process control, file management, device management, information maintenance, and communication. Accordingly, the action of a current process can be obtained by capturing a system call thereof, and the technique for capturing the system call may be referred to "Panorama: Capturing System-wide Information Flow for Malware Detection and Analysis" disclosed by Heng Yin and Dawn Song in 2007 on the Association for Computing Machinery Conference on Computer and Communications Security.

In the present embodiment, the system calls of each process are captured to monitor the actions of the process in the computer system. If the process is related to another element, the relation between the two is recorded in the relation graph. The relation graph includes a plurality of nodes, these nodes are respectively corresponding to a plurality of processes in the OS and elements related to these processes, and the relations between the nodes are established according to the relations among the processes and the elements.

Figure 2:
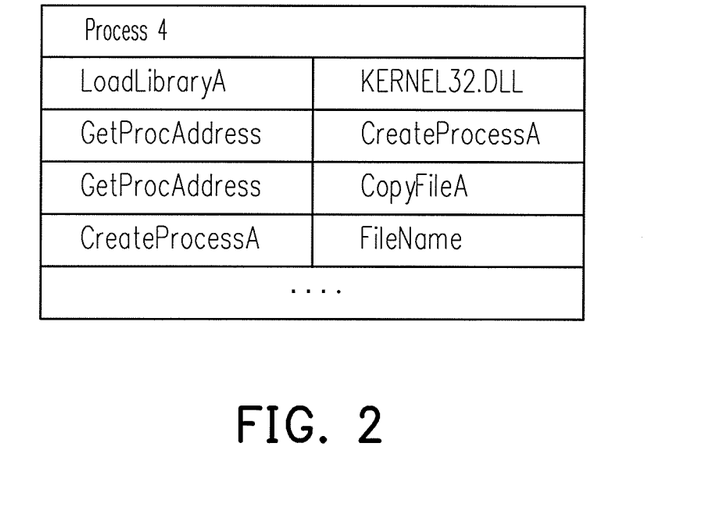
FIG. 2 is a diagram illustrating part of the data obtained by capturing system calls according to an embodiment of the present invention.
Figure 3A:
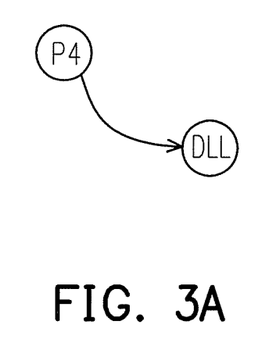
FIG. 3A and FIG. 3B are diagrams of a relation graph established according to the data in FIG. 2.
Figure 3B:
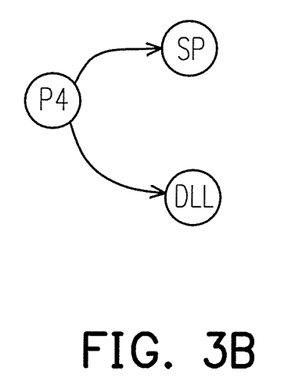

The method for establishing a relation graph will be described herein with an example. FIG. 2 is a diagram illustrating part of the data obtained by capturing system calls according to an embodiment of the present invention. FIG. 3A and FIG. 3B are diagrams of a relation graph established according to the data in FIG. 2. Referring to FIG. 2, FIG. 3A, and FIG. 3B, FIG. 2 illustrate part of the data obtained by capturing a system calls of a process 4, and FIG. 3A and FIG. 3B illustrate a relation graph established according to the data in FIG. 2, wherein the node P4 is corresponding to the process 4.

As shown in FIG. 2, LoadLibraryA and KERNEL32.DLL in the first row represent "load KERNEL32.DLL". Then, as shown in FIG. 3A, an outgoing relation is produced on the node P4 to associate the node P4 with the node DLL, wherein the node DLL is corresponding to KERNEL32.DLL. GetProcAddress and CreateProcessA in the second row represent "obtain the address of CreateProcessA from KERNEL32.DLL". Because the instruction of CreateProcessA is in the DLL "KERNEL32.DLL, the relation graph is established as shown in FIG. 3A (it is not needed to establish another relation). The data in the third row is similar to that in the second row (i.e., the instruction of CopyFileA is in the DLL KERNEL32.DLL), and accordingly the relation graph is established as shown in FIG. 3A. CreateProcessA and FileName in the fourth row represent "execute a sub process". Herein the relations between the elements in the relation graph are as illustrated in FIG. 3B, wherein an outgoing relation is produced on the node P4 to associate the node P4 with the node SP, and the node SP is corresponding to aforementioned sub process.

Figure 4:
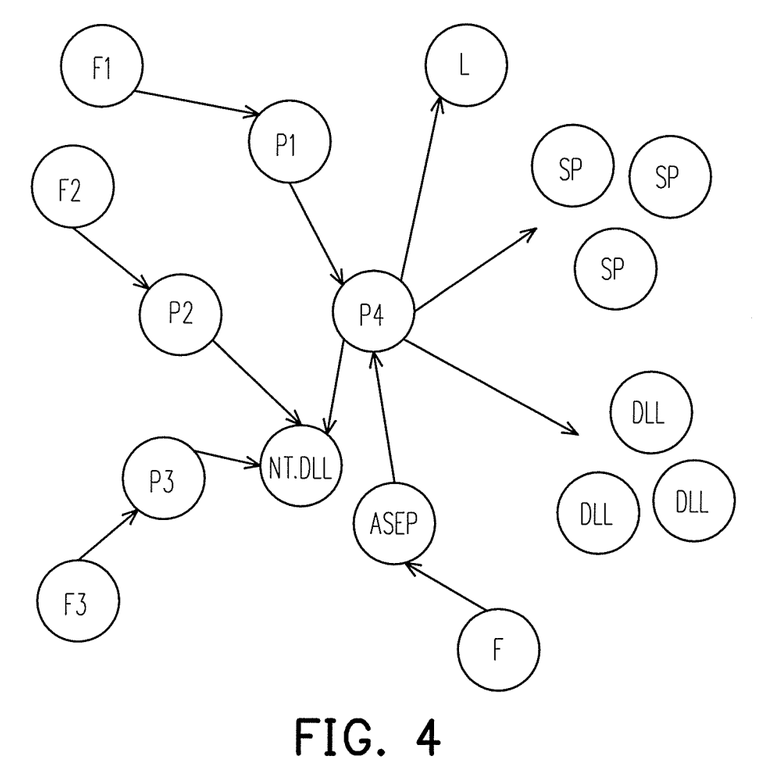
FIG. 4 is a diagram of a relation graph according to an embodiment of the present invention.

As described above, the relations between all related processes can be obtained by capturing system calls of all the processes. The establishment of the relation graph will be further described in detail according to an embodiment of the present invention. FIG. 4 is a diagram of a relation graph according to an embodiment of the present invention. Referring to FIG. 4, it is assumed that the system calls of processes 1, 2, 3, and 4 are captured, and these processes are respectively corresponding to nodes P1, P2, P3, and P4.

When the OS executes a process, nodes corresponding to the related elements of the process are established in the relation graph. For example, the process 1 is executed by an executable file. Accordingly, an incoming relation is produced on the node P1 to associate the node P1 with the node F1. Subsequently, when the OS executes the process 2, it requires an external DLL besides the executable file. Accordingly, in the relation graph, an incoming relation is produced on the node P2 to associate the node P2 with the node F2, and an outgoing relation is produced on the node P2 to associate the node P2 with the node NT.DLL. The executions of the processes 3 and 4 can be deduced based on foregoing description.

As shown in FIG. 4, because the process 4 is registered in the auto start extension point (ASEP) of the OS, the process 4 corresponding to the node P4 is automatically started every time when the operating system is turned on, and accordingly a relation enters the node P4 from the node ASEP in FIG. 4. Besides, the process 4 further executes a plurality of sub processes (SPs), uses a network connection L, and loads a plurality of DLLs.

It should be mentioned that a malicious process monitoring program also detects whether a malicious process exists when the relation graph is established. If the malicious process monitoring program detects a malicious process, it marks the malicious process in the relation graph right away. The malicious process monitoring program can detect the malicious process through any existing technique, for example, by using the feature code of the malicious process. If a process that ever detects whether the malicious process is still alive through any technique is detected, the process may be an instigator for monitoring the malicious process. Accordingly, a relation between this process and the malicious process is recorded in the relation graph.

Herein it is assumed that the process 4 is a malicious process and the process 1 detects whether the process 4 is still alive. Accordingly, an incoming relation is produced on the node P4 to associate the node P4 to the node P1.

Next, referring to FIG. 1 again, after the relation graph is established, in step S110, a node marking action is performed on each node in the relation graph when the computer system satisfies a predetermined condition. For example, when the malicious process is about to jeopardize the OS, the establishing of the relation graph is stopped and the node marking action is performed. Besides, when the malicious process is marked in the relation graph and an incoming relation (for example, the relation from the node P1 to the node P4 as shown in FIG. 4) is produced on the node corresponding to the malicious process, the establishing of the relation graph is stopped and the node marking action is performed.

The behaviors for jeopardizing the OS of the malicious process may be summarized in advance so that how the malicious process will jeopardize the OS can be understood. However, this is only an example but not for limiting the present invention.

In addition, the node marking action is to mark each node along the incoming relation or the outgoing relation of the node. Different type of nodes has different node marking rule, and whether the label of each node can spread along the outgoing relation or the incoming relation of each node is determined according to the node marking rule, so as to determine whether the nodes related to the current node are marked with the label of the current node.

For example, the node corresponding to a process is marked along both the outgoing relation and the incoming relation thereof in an outspread manner. In addition, the node corresponding to a DLL can only be marked through the incoming relations of its related nodes but cannot be marked in the outspread manner. Referring to FIG. 4, the node marking action is to mark from the node P4 (or the node P2 or P3) to the node NT.DLL and stop marking outwards from the node NT.DLL. In addition, the node corresponding to an ASEP is marked along the incoming relation and outgoing relation thereof in the outspread manner. Referring to FIG. 4, after the node marking action marks from the node P4 to the node ASEP, it further marks from the node ASEP to the node F.

Figure 5:
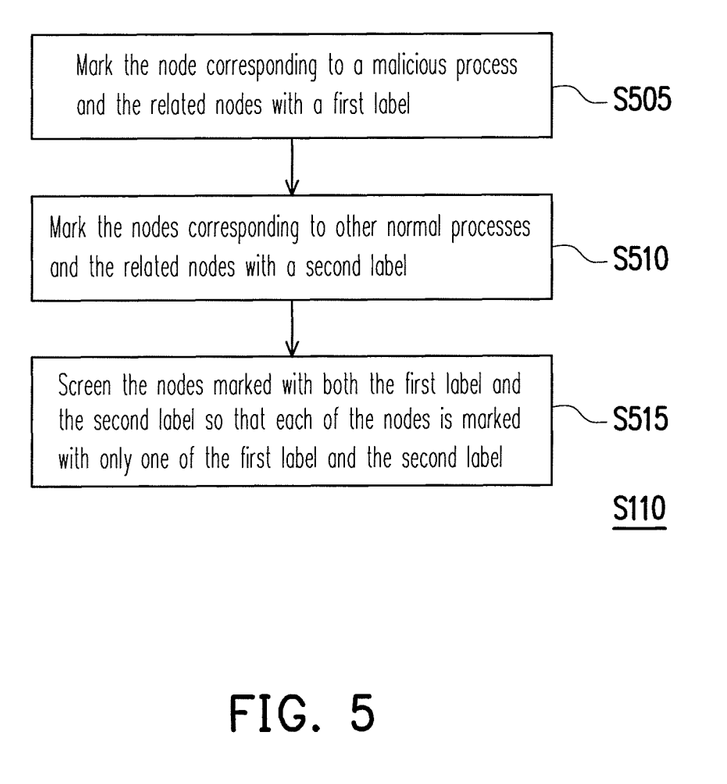
FIG. 5 is a flowchart of a node marking action according to an embodiment of the present invention.

Step S110 will be described herein in detail with reference to an embodiment of the present invention. FIG. 5 is a flowchart of a node marking action according to an embodiment of the present invention. Referring to FIG. 5, first, in step S505, the node corresponding to a malicious process and its related nodes are marked with a first label. Herein, the nodes are marked with different colors. For example, when the malicious process is detected through a malicious process detection technique, the node corresponding to the malicious process in the relation graph is marked with a first color, and the related nodes thereof are marked according to foregoing node marking rule, so as to mark the nodes corresponding to the elements related to the malicious process with the first color.

Next, in step S510, the nodes corresponding to other normal processes that are not marked with the first label are marked with a second label, and their related nodes are marked according to foregoing node marking rule, so as to mark these related nodes with the second label. For example, the nodes corresponding to the normal processes and the nodes corresponding to the elements related to the normal processes are all marked with a second color.

After that, in step S515, those nodes marked with both the first label and the second label are screened so that each of the nodes is marked with only the first label or the second label. Because after the node marking action is performed, the node corresponding to an element that is shared between the normal processes and the malicious process may be marked with both the first label and the second label, whether this node should be marked with the first label or the second label has to be further determined.

Figure 6A:
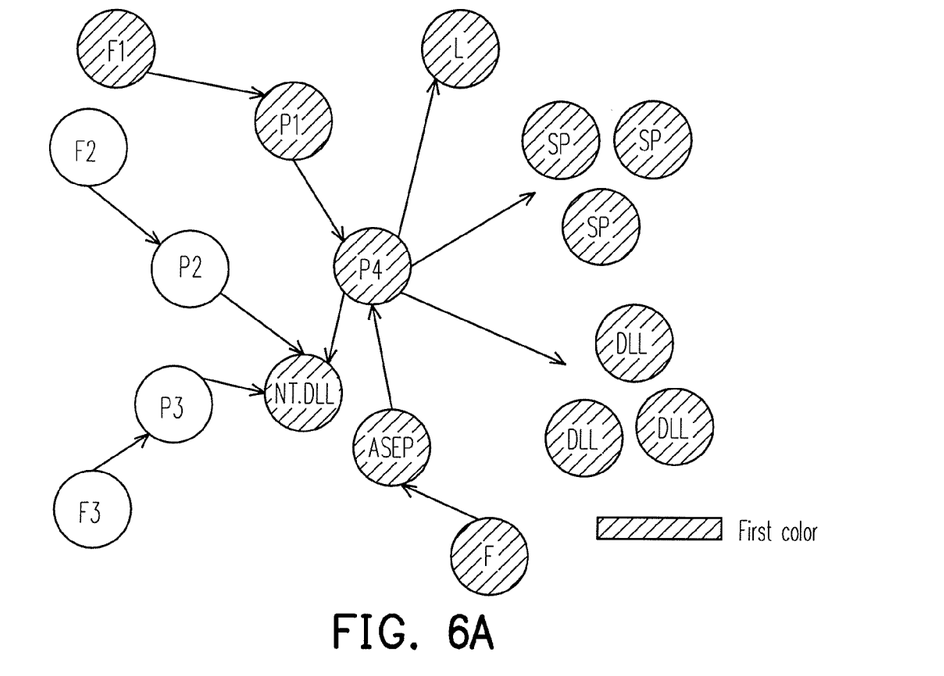
FIG. 6A and FIG. 6B are diagrams illustrating how nodes are marked according to an embodiment of the present invention.
Figure 6B:
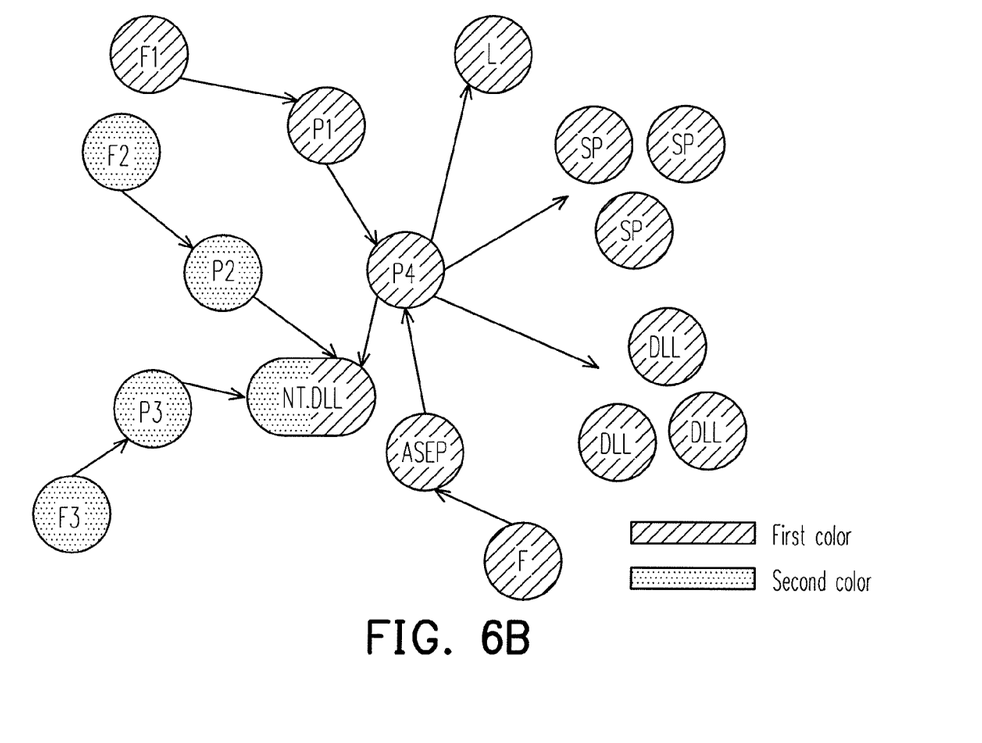

FIG. 6A and FIG. 6B are diagrams illustrating how nodes are marked according to an embodiment of the present invention. Referring to FIG. 6A and FIG. 6B, when the process 4 is detected as a malicious process, the node P4 is marked with the first color, and the elements related to the process 4 are all marked with the first color, as shown in FIG. 6A. Then, the normal processes 2 and 3 and the nodes corresponding to their related elements are all marked with the second color. Accordingly, only the nodes P2 and P3 and their related nodes are marked with the second color, as shown in FIG. 6B.

It should be noted that the nodes P2, P3, and the node P1 corresponding to the malicious process are all related to the node NT.DLL. This is because the element corresponding to the node NT.DLL is an important DLL, and almost all the processes have to load this DLL. Thus, if the node NT.DLL is deleted because it is related to the node P4 (i.e., the malicious process), the computer system will not be able to work normally. In order to prevent such a situation, in the present embodiment, when a node is marked with both the first label and the second label, whether the element corresponding to the node is infected by the malicious process is further determined.

Figure 7:
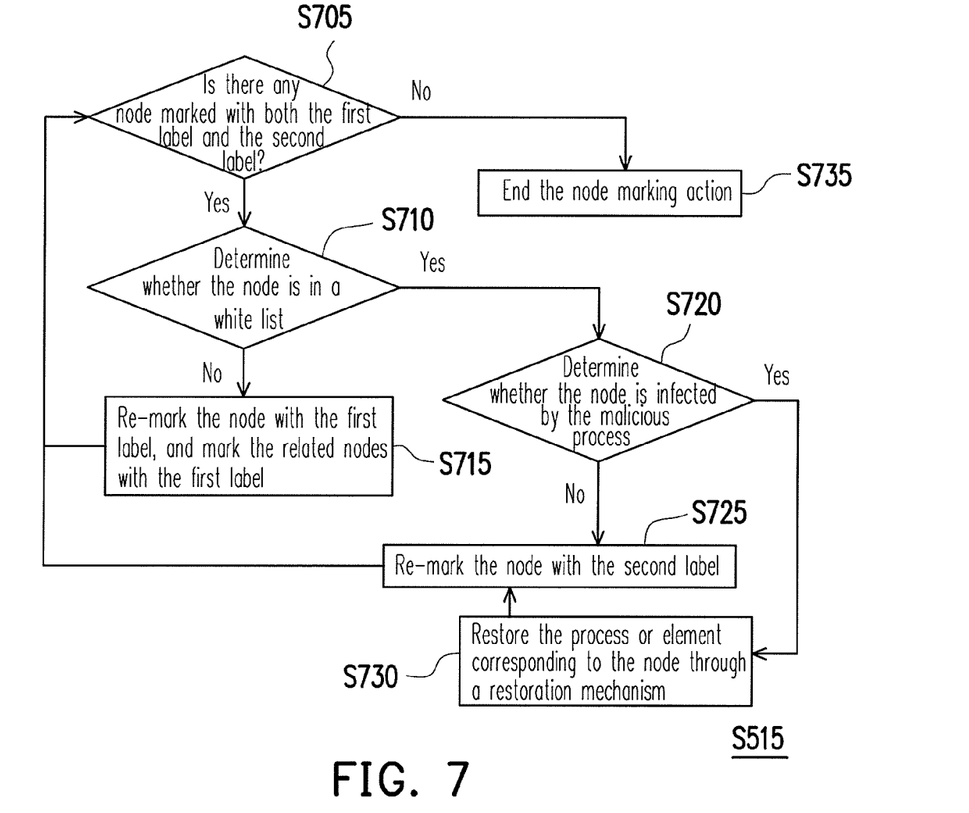
FIG. 7 is a flowchart illustrating how nodes marked with two labels are screened according to an embodiment of the present invention.

Below, step S515 will be described in detail with reference to an embodiment of the present invention. FIG. 7 is a flowchart illustrating how nodes marked with two labels are screened according to an embodiment of the present invention. Referring to FIG. 7, in step S705, whether there is any node among the marked nodes that is marked with both the first label and the second label is determined. If such a node is detected, step S710 is executed; otherwise, step S735 is executed to end the node marking action.

In step S710, whether the node is in a white list is determined, wherein the white list is a predetermined list and which records those important elements in the OS that are shared by all the processes therefore cannot be deleted, such as NT.DLL. Generally speaking, each OS has fixed elements that are shared by the processes, and accordingly the shared elements can be preset in the white list. If the element corresponding to the node marked with both labels is not in the white list, it is determined that the node is not used by other normal processes, and accordingly, in step S715, the node is re-marked with the first label, and its related nodes are marked with the first label according to the node marking rule. After that, step S705 is executed repeatedly.

On the other hand, if the element corresponding to the node marked with both labels is in the white list, the element may be infected by the malicious process. After that, in step S720, an inspection action is performed on the node to determine whether the node is infected by the malicious process. For example, whether the process or element corresponding to the node is infected by the malicious process may be determined through a hash algorithm, wherein the hash algorithm may be the message-digest algorithm 5 (MD5) or the secure hash standard (SHA) algorithm. To be specific, a checksum of the shared element is calculated through the hash algorithm, and the checksum is compared with a checksum of the same element recorded at a previous OS checkpoint. If the two checksums of the same element are the same, it is determined that the shared element is not infected by the malicious process; otherwise, if the two checksums are different, it is determined that the shared element is infected by the malicious process.

An OS usually has a checkpoint mechanism for backing up information at checkpoints after system update. Accordingly, whether a current element is infected can be determined by using an element stored at a previous checkpoint.

Next, if it is determined that the element corresponding to the node is not infected by the malicious process, in step S725, the node is re-marked with the second label. After that, step S705 is executed repeatedly until all the nodes are marked with the first label or the second label. Contrarily, if the element corresponding to the node is infected by the malicious process, in step S730, the process or element corresponding to the node is restored through a restoration mechanism. For example, an uninfected element is obtained from a database or downloaded from the Internet. Or, the process or element is restored by using the element recorded at the previous checkpoint. After that, step S725 is executed again to re-mark the node with the second label, and step S705 is executed repeatedly until all the nodes are marked with the first label or the second label.

Finally, referring to FIG. 1 again, after the node marking action is performed, in step S115, the processes and elements corresponding to the nodes marked with only the first label are removed from the storage device (for example, the memory and hard disk) of the computer system.

It should be noted that the malicious process will be automatically executed without user's authorization, so as to gain the control over the computer system, every time when the computer system is turned on. For example, a specific relation at the ASEP points to a specific executable file. Thus, the node ASEP is not deleted when it is marked with the first label. Instead, the settings related to the malicious process in the ASEP are removed. In other words, different nodes are cleaned differently, and the rules for cleaning different nodes can be preset to be referred subsequently.

Figure 8:
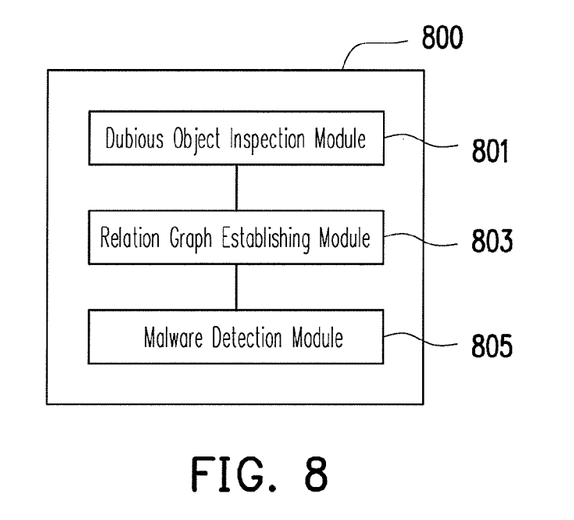
FIG. 8 is a block diagram of a malware cleaning system according to an embodiment of the present invention.

A malware cleaning system is further provided by the present invention. FIG. 8 is a block diagram of a malware cleaning system according to an embodiment of the present invention. Referring to FIG. 8, the malware cleaning system 800 includes a relation graph establishing module 803, a malware detection module 805, and a dubious object inspection module 801.

The relation graph establishing module 803 is suitable for establishing a relation graph, wherein the relation graph may be established through foregoing step S105 therefore will not be described herein. The malware detection module 805 is suitable for detecting a malicious process in an OS. The dubious object inspection module 801 is suitable for performing a node marking action on the relation graph when a predetermined condition is satisfied, wherein the node marking action is as described in foregoing step S110 (including steps S505~S515 and steps S705~S735) therefore will not be described herein. After performing the node marking action, the dubious object inspection module 801 removes those processes and elements corresponding to the nodes marked with a first label, as described in foregoing step S115.

The malware cleaning system 800 in FIG. 8 may be a part of the OS to be protected or independent to the OS. If the malware cleaning system 800 is a part of the OS, the OS has to be altered so that the malware cleaning system 800 can be integrated therein. If the malware cleaning system 800 is independent to the OS, the malware cleaning system 800 can be implemented as a part of a virtual machine software, and the OS can be executed through this virtual machine software.

The present invention further provides a non-transitory computer program product composed of a plurality of program instructions. These program instructions are suitable for being loaded into the computer system and executed by the same to accomplish the steps in the malware cleaning method described above. In addition, the present invention further provides a non-transitory computer-readable storage medium for storing a computer program, wherein the computer program is suitable for being loaded into a computer system and executed by the same to accomplish the steps in the malware cleaning method described above.

As described above, in the malware cleaning method provided by the present invention, a relation graph is first established, and the node corresponding to a malicious process is marked through a malware detection technique. Then, a node marking action is performed on the relation graph to obtain the elements related to the malicious process. Next, those dubious elements are further inspected to find out the elements infected by the malicious process. Thereafter, the infected elements are removed. Thereby, in the embodiments described above, the malicious process and the elements related to the malicious process can all be detected, and an instigator can be found, so that the malware can be completely removed. Even though the malicious process generates its file name randomly, the malicious process can be marked in the relation graph. Furthermore, even though the computer system is already infected, the malware cleaning system provided by the present invention can still be deployed for cleaning the malware. Namely, the malware can be cleaned through the method described above regardless of whether the computer system is infected or not.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A malicious software (malware) cleaning method, comprising:
    establishing a relation graph, wherein the relation graph comprises a plurality of nodes, the nodes are respectively corresponding to a plurality of processes in an operating system (OS) and elements related to the processes, and relations between the nodes are established according to relations among the processes and the elements;
    performing a node marking action on the relation graph when a predetermined condition is satisfied, wherein the node marking action comprises marking each of the nodes along both or one of an outgoing relation and an incoming relation of the node, and the node marking action further comprises:
        marking the node corresponding to a malicious process and the related nodes with a first label;
        marking the nodes without the first label and corresponding to other normal processes and the related nodes with a second label; and
        screening the nodes marked with both the first label and the second label so that each of the nodes is marked with only one of the first label and the second label; and
    removing the processes and the elements corresponding to the nodes marked with the first label.

2. The malware cleaning method according to claim 1, wherein the node marking action is to determine whether the label of each of the nodes can spread along both or one of the outgoing relation and the incoming relation of the node according to a node marking rule, so as to determine whether to mark the nodes related to the node with the label of the node.

3. The malware cleaning method according to claim 1, wherein the step of screening the nodes marked with both the first label and the second label comprises:
    when one of the nodes is marked with both the first label and the second label, determining whether the node is in a white list, so as to re-mark the node with the first label or the second label.

4. The malware cleaning method according to claim 3, wherein the step of determining whether the node marked with both the first label and the second label is in the white list comprises:
    if the node is not in the white list, re-marking the node with the first label and marking the nodes related to the node with the first label; and
    if the node is in the white list, performing an inspection action on the node to determine whether the node is infected by the malicious process.

5. The malware cleaning method according to claim 4, wherein the inspection action comprises:
    inspecting whether the process or the element corresponding to the node is infected by the malicious process through a hash algorithm;
    re-marking the node with the second label if the process or the element corresponding to the node is not infected by the malicious process; and
    restoring the process or the element corresponding to the node through a restoration mechanism if the process or the element corresponding to the node is infected by the malicious process.

6. The malware cleaning method according to claim 5, wherein after the step of restoring the process or the element corresponding to the node through the restoration mechanism, the malware cleaning method further comprises:
    re-marking the node with the second label.

7. The malware cleaning method according to claim 1, wherein the predetermined condition is that the malicious process is detected among the processes and is about to jeopardize the OS.

8. The malware cleaning method according to claim 1, wherein the predetermined condition is that the malicious process is detected among the processes and the incoming relation is produced on the node corresponding to the malicious process.

9. A malware cleaning system, comprising:
    a relation graph establishing module, for establishing a relation graph, wherein the relation graph comprises a plurality of nodes, the nodes are respectively corresponding to a plurality of processes in an OS and elements related to the processes, and relations between the nodes are established according to relations among the processes and the elements;
    a malware detection module, for detecting a malicious process among the processes in the OS; and
    a dubious object inspection module;
    wherein the dubious object inspection module performs a node marking action on the relation graph when a predetermined condition is satisfied, the node marking action comprises marking each of the nodes along both or one of an outgoing relation and an incoming relation of the node, the node marking action further comprises:
    marking the node corresponding to the malicious process and the related nodes with a first label; marking the nodes without the first label and corresponding to other normal processes and the related nodes with a second label; and screening the nodes marked with both the first label and the second label, so that each of the nodes is marked with only one of the first label and the second label;
    and thereafter, the dubious object inspection module removes the processes and the elements corresponding to the nodes marked with the first label.

10. The malware cleaning system according to claim 9, wherein the dubious object inspection module determines whether the label of each of the nodes can spread along both or one of the outgoing relation and the incoming relation of the node according to a node marking rule, so as to determine whether to mark the nodes related to the node with the label of the node.

11. The malware cleaning system according to claim 9, wherein when the dubious object inspection module screens the nodes marked with both the first label and the second label, the dubious object inspection module further executes:
when one of the nodes is marked with both the first label and the second label, determining whether the node is in a white list;
if the node is not in the white list, re-marking the node with the first label and marking the nodes related to the node with the first label; and
if the node is in the white list, performing an inspection action on the node to determine whether the node is infected by the malicious process.

12. The malware cleaning system according to claim 11, wherein the inspection action performed by the dubious object inspection module comprises:
inspecting whether the process or the element corresponding to the node is infected by the malicious process through a hash algorithm;
if the process or the element corresponding to the node is not infected by the malicious process, re-marking the node with the second label;
if the process or the element corresponding to the node is infected by the malicious process, restoring the process or the element corresponding to the node through a restoration mechanism.

13. The malware cleaning system according to claim 12, wherein after the dubious object inspection module restores the process or the element corresponding to the node through the restoration mechanism, the dubious object inspection module further executes:
re-marking the node with the second label.

14. The malware cleaning system according to claim 9, wherein the predetermined condition is that the malware detection module detects the malicious process among the processes and that the malicious process is about to jeopardize the OS.

15. The malware cleaning system according to claim 9, wherein the predetermined condition is that the malware detection module detects the malicious process among the processes and the incoming relation is produced on the node corresponding to the malicious process in the relation graph.

16. A non-transitory computer-readable storage medium, for storing a computer program, wherein the computer program is suitable for being loaded into a computer system and executed by the computer system to accomplish a malicious software (malware) cleaning method, and the malware cleaning method comprises:
establishing a relation graph, wherein the relation graph comprises a plurality of nodes, the nodes are respectively corresponding to a plurality of processes in an operating system (OS) and elements related to the processes, and relations between the nodes are established according to relations among the processes and the elements;
performing a node marking action on the relation graph when a predetermined condition is satisfied, wherein the node marking action comprises marking each of the nodes along both or one of an outgoing relation and an incoming relation of the node, and the node marking action further comprises:
marking the node corresponding to a malicious process and the related nodes with a first label;
marking the nodes without the first label and corresponding to other normal processes and the related nodes with a second label; and
screening the nodes marked with both the first label and the second label so that each of the nodes is marked with only one of the first label and the second label; and
removing the processes and the elements corresponding to the nodes marked with the first label.

17. A non-transitory computer program product, comprising a plurality of program instructions, wherein the program instructions are suitable for being loaded into a computer system and executed by the computer system to accomplish a malicious software (malware) cleaning method, and the malware cleaning method comprises:
establishing a relation graph, wherein the relation graph comprises a plurality of nodes, the nodes are respectively corresponding to a plurality of processes in an operating system (OS) and elements related to the processes, and relations between the nodes are established according to relations among the processes and the elements;
performing a node marking action on the relation graph when a predetermined condition is satisfied, wherein the node marking action comprises marking each of the nodes along both or one of an outgoing relation and an incoming relation of the node, and the node marking action further comprises:
marking the node corresponding to a malicious process and the related nodes with a first label;
marking the nodes without the first label and corresponding to other normal processes and the related nodes with a second label; and
screening the nodes marked with both the first label and the second label so that each of the nodes is marked with only one of the first label and the second label; and
removing the processes and the elements corresponding to the nodes marked with the first label.

* * * * *